Jan. 8, 1963 L. E. LEVINSON 3,071,786
BOATS
Filed Jan. 13, 1960

INVENTOR
Louis E. Levinson

BY *Walter J Jagn*

ATTORNEY

United States Patent Office 3,071,786
Patented Jan. 8, 1963

3,071,786
BOATS
Louis E. Levinson, 6458 Royal Lane, Dallas, Tex.
Filed Jan. 13, 1960, Ser. No. 2,252
14 Claims. (Cl. 9—2)

This invention relates to boats and more particularly to a sectional boat convertible into a shelter and into a trailer.

This application is a continuation-in-part of my co-pending application, Serial No. 854,034 executed November 16, 1959, on Boats.

An object of this invention is to provide a new and improved boat which is convertible into a shelter.

Another object is to provide a new and improved sectional boat of the runabout type having a partially enclosed front section which is pivotable about a rear section to overlie the latter to form a shelter.

Still another object is to provide a sectional boat having a front section provided with a windshield and parallel side wings extending rearwardly from the windshield which are pivotable inwardly into the front section to retracted positions whereby the front section may be pivoted over the rear section to form a closed trailer.

A further object is to provide a boat having a rear section and a front section pivotally secured together wherein the front section has a deck extending inwardly of the sides of the front section and a windshield and side wings pivotally secured to the top deck whereby the windshield and the side wings may be folded inwardly to retracted positions below the inner edges of the top deck whereby the front section may then be pivoted over the rear section to form a closed trailer, the rear section having a weather flange extending inwardly upwardly and telescoping within the top deck of the front section.

A still further object is to provide a boat having a front section and a rear section, the front section having a windshield and a pair of side wings extending rearwardly from the windshield wherein each of the side wings is formed of a pair of complementary sections pivotally secured together whereby the sections of the side wings when moved to fully extended positions relative to one another are adapted to enclose the space between the front section and the rear section when the front section angularly overlies the rear section to form a shelter.

Another object is to provide a boat having a rear section and a front section pivotally secured together wherein the rear section is provided with an upwardly extending weather flange which is engageable by the side wings of the front section when the front section overlies the rear section to provide a shelter.

Still another object of the invention is to provide a boat wherein the rear section is provided with wheels and with a draw bar means which extends forwardly of the rear section when the forward section is in its open extended position.

Additional objects and advantages of the invention will be readily apparent from the reading of the following description of a device constructed in accordance with the invention, and references to the accompanying drawings thereof, wherein.

Figure 1:
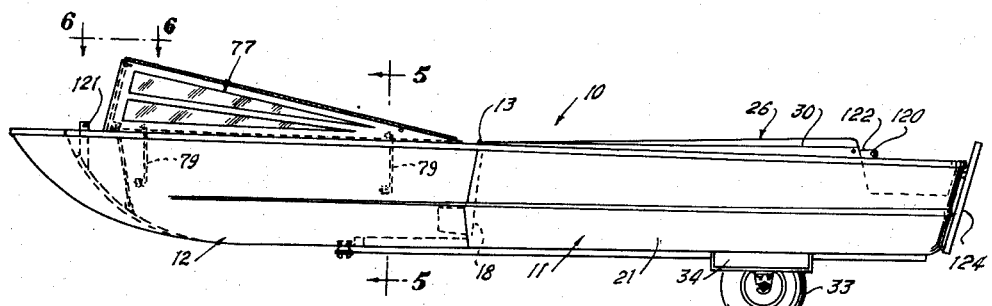
FIGURE 1 is a side view of the boat embodying the invention showing the two sections in open extended positions and with the retractible wheels of the rear section in extended ground engaging position.

Referring now to the drawing, the boat 10 includes a rear section 11 and a front section 12 pivotally secured together by a hinge 13. The rear section is provided with a bottom 16 from which extend upwardly the rear and front walls 17 and 18 and the side walls 20 and 21. The rear wall 17 forms a transom to which an outboard motor may be removably secured to propel the boat through the water. The rear section also has a top deck 25 which extends inwardly over the side and end walls of the boat and is provided with a continuous upwardly extending weather flange 26 spaced inwardly of the outer edges of the deck. The outer sides of weather flange 26 are provided with upwardly facing shoulders 30 disposed outwardly of and below the upper edges of the weather flange.

Figures 2, 4:
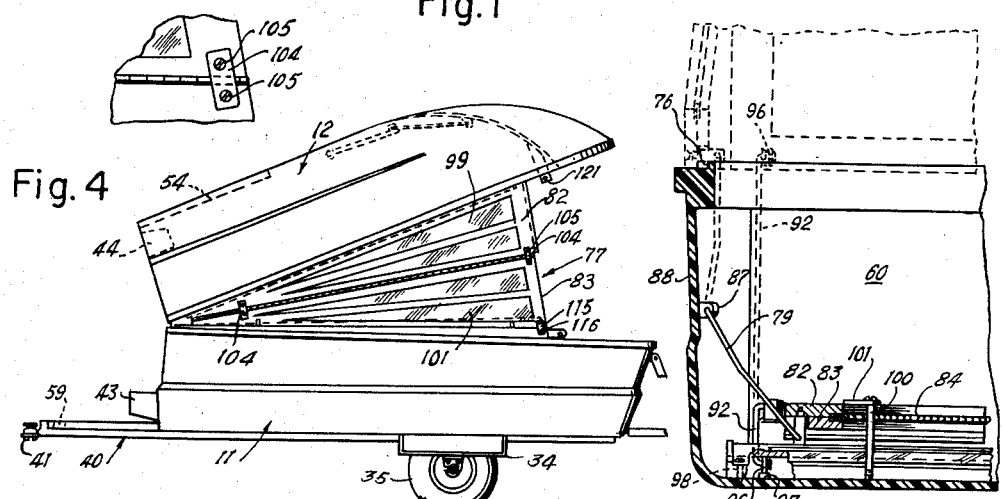
FIGURE 2 is a side view showing the front section moved to a position angularly overlying the rear section and with the side wing sections in extended positions to form a shelter.
FIGURE 4 is a fragmentary plan view showing the manner in which the sections of the side wings are rigidly secured together when in extended positions.

The rear section is also provided with a pair of wheel wells 32 and 33 in which are retractible the ground engaging wheels 33 which are movable between retracted positions within the wells and the extended positions illustrated in FIGURES 1 and 2. The wells are provided with doors 34 which may be closed when the wheels are in their retracted positions. The open upper ends of the wheel wells are closed by covers 36 which are pivotally secured to the wells in any suitable manner, as by hinges 38. The manner in which the wheels and the doors are constructed and mounted is more fully described in my co-pending application referred to above.

The rear section is provided with a keel and draw bar member 40 whose lower portions extend below the lower surface of the bottom 16 of the rear section to form a keel and whose forward portion is provided with a hitch member 41 by means of which the draw bar member may be connected to any suitable towing vehicle.

The front wall 18 of the rear section is provided with a boss 43 receivable in a socket 44 provided in the rear wall 47 of the front section 12. The rear wall of the front section has a seat 48 which provides the socket whose configuration is similar to that of the boss 43 whereby the boss is received in the socket 44 when the front section is in the fully extended position illustrated in FIGURES 1 and 3. The boss and seat members are provided with suitable aligned apertures in which are receivable the pins 50 which secure the front and rear sections together.

Figures 3, 6:
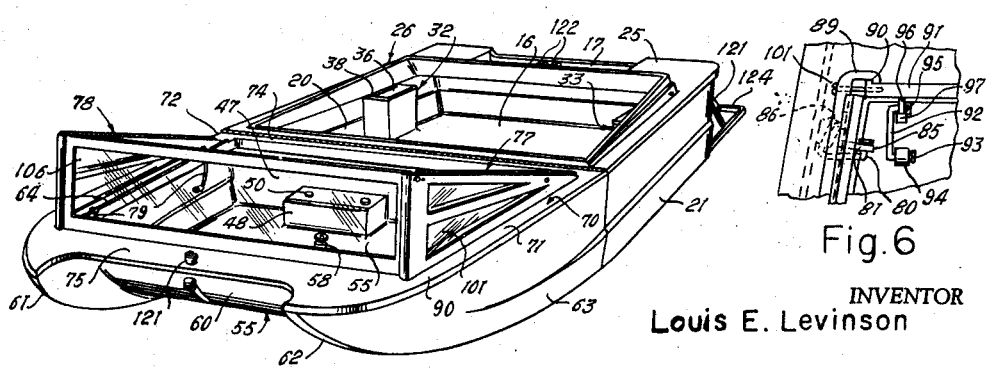
FIGURE 3 is a perspective view of the boat showing the windshield and side wings in their upper positions to form a runabout.

The forwardly extending portion of the draw bar is receivable in suitable groove means 54 provided in the under surface of the bottom 55 of the front section when the front section is in the fully extended position illustrated in FIGURES 1 and 3 of the drawing.

The bottom 55 is also provided with a connector member 58 which engages with cooperating means 59 on the draw bar member 41 to rigidly secure the two sections together in the fully extended positions illustrated in FIGURES 1 and 3. The exact structure of the cooperable connecting members 58 and 59 is fully described in my co-pending application referred to above.

The bottom 55 of the front section curves upwardly as at 60 between the bow planes 61 and 62 of the front section. The sides 63 and 64 of the front section extend upwardly from the bottom and between the rear side 47 and the bow planes. The front section has a top deck 70 which extends inwardly from the side and rear walls and from the upper end portion 60 of the bottom.

The top deck 70 has side sections 71 and 72 which extend inwardly of the sides 63 and 64, respectively, a rear section 74 which extends forwardly and inwardly of the rear wall 47 and a front section 75 which extends inwardly of the forward portion 60 of the bottom wall.

Figure 5:
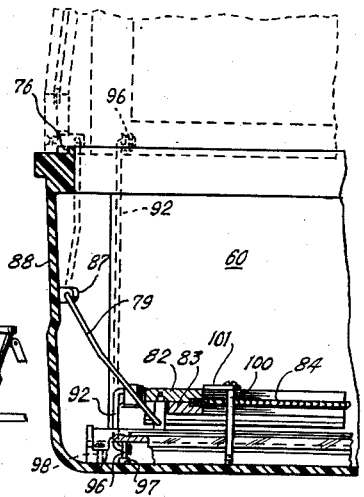
FIGURE 5 is a cross-sectional view showing the windshield and the side wings of the front sections in retracted positions in the inner section below the deck of the front section; and, FIGURE 6 is a fragmentary top view taken along the line 6—6 of FIGURE 1.

A weather flange 76 extends upwardly from the inner edges of the side sections 71 and 72 and the front section 75 of the top deck. The pair of side wings 77 and 78 are secured to the sides of the front section below the top deck by pairs of pivot links 79 whose upper angularly extending ends 80 extend through suitable lugs or brackets 81 secured to the outer sections 82 of the side wings. Each of the side wings has an inner section 83 which is pivotally secured to the outer section by any suitable means, such as a hinge pin 84, the brackets extending through suitable slots in inner sections when the inner sections are folded adjacent the outer sections as seen in FIGURE 5. The brackets may be provided with resilient means or pads at their free ends for a purpose to be described below.

The other angularly extending end portions 86 of the pivot links 79 extend through suitable lugs 87 secured to the side walls 88 of the boat in any suitable manner. The brackets 87 extend rearwardly at an angle from the side walls 88 so that the side wings move rearwardly from the front section 75 of the deck as the hinge links 79 are pivoted inwardly and then downwardly from the upper raised positions illustrated in broken lines in FIGURE 5 to the retracted positions illustrated in full lines in FIGURE 5.

The outer sections of the side wings are provided with incurved edge portions 89 which form a rearwardly opening recess in which are receivable the forwardly extending side flanges 90 of a windshield 91.

The windshield is secured to the bottom wall 60 of the front section by a pair of hinge links 92 whose lower angularly bent end portions 93 extend through suitable apertures in the brackets 94 secured in any suitable manner to the bottom wall 60 of the front section and whose upper angularly bent end portions 95 extend through suitable apertures in the inwardly extending brackets 96 of the windshield 91 disposed adjacent the side edges thereof. Each of the brackets 95 may be provided with a suitable resilient pad or bumper 97.

The windshield may be held in the retracted position illustrated in FIGURES 2 and 5 by any suitable means such as screws 98 which are threadedly receivable in suitable threaded bores or sockets of the bottom of the front section. The wing sections when in retracted positions overlie the windshield 91 and may be held in such retracted positions by any suitable means such as a clamp rod 100 whose lower end is threadedly receivable in a suitable threaded bore of the bottom of the front section and whose upper end is provided with an angularly outwardly extending tab or strap 101 for engaging the upper surfaces of the outer sections 83 of the side wings.

The resilient pads 85 and 97 obviously prevent rattling of the windshield and the side wings and the marring of the windshield and the bottom of the boat by the brackets.

The side wings and the windshield may be moved from the retracted positions illustrated in FIGURE 5 to the operative positions illustrated in FIGURE 3 by first pivoting the side wing sections upwardly about the angularly bent end portions 86 of the hinge links 79, the wing sections moving forwardly and outwardly during such pivotal movement of the hinge sections to clear the forward portions of the weather flange 76 and then are pivoted about the end portions 80 thereof so that their lower edges abut the outside surfaces of the side portions of the weather flange. The windshield is then similarly rotated upwardly about the inturned portions 93 of the hinge links 92 to cause its flanges 90 to be received in the groove formed by the inturned portions 89 of the outer sections of the side wings and to cause its lower edge portions to be disposed outwardly and abut the front section of the weather flange 76 which extends upwardly from the front section 75 of the top deck. Screws 101 may then be employed to secure the outer sections of the side wings to the lateral side edges of the windshield, the windshield having threaded bores for receiving the screws 101. It will be noted that the windshield and the side wings are disposed outwardly of the weather flange so that no water will tend to flow upwardly therebetween into the boat.

When it is desired to move the windshield and the side wings to their retracted positions, the screws 101 are removed and the windshield 91 is moved first upwardly and then rearwardly out of engagement with the incurved portions 89 of the outer sections of the side wings and then to its lowermost position wherein it lies on the bottom of the boat. The side wings are then first pivoted about the inturned portions 80 of the hinge pins 79 and then lowered inwardly and rearwardly so that the forward incurved portions 89 clear the front section of the weather flange 76 during such downward movement. It will of course be apparent that a resilient gasket of rubber or the like may be inserted between the recess formed by the incurved portions 89 of the outer sections of the side wings to be engaged by the flange 90.

The sections of each side wing may be held in the extended positions illustrated in FIGURE 2, wherein they form a shelter by any suitable means, such as a strap bar 104 secured to the two sections by means of screws 105 which extend into suitable threaded bores or sockets provided in the main and auxiliary sections of the side wings.

The side wing sections are triangular in shape sloping rearwardly toward the rear of the boat whereby the narrow end portions thereof are disposed outwardly of the seat 48 and beneath the side sections of the deck. The side wing sections may be provided with windows 99, if desired.

When the windshield and the side wings are in their retracted positions wherein they lie inwardly of the inner edges of the top deck, the front section may be pivoted in a clockwise manner about the hinge 13 to a position wherein it overlies and closes the rear section 11 with the flange 25 received between the inner edges of the top deck 70 of the front section. The front section may be locked in its fully closed position by means of a bolt 120 which extends through suitable aligned apertures in the tubular socket 121 of the front section and the brackets 122 secured to the flange 26 of the rear section, as is more fully described in my co-pending application. If the wheels 33 are now in their extended positions, the draw and keel bar member 40 may be secured by means of the hitch member 41 to a towing vehicle to move the boat from one location to another or to move materials or goods stored in the rear section from one location to another.

When it is desired to convert the boat into a shelter, assuming that the windshield and the side wings are in their retracted positions illustrated in FIGURE 5, the side wings are moved outwardly to their extended positions and the inner sections are pivoted outwardly and secured in the extended positions illustrated in FIGURE 2 by means of the straps 104. The front section of the boat is then pivoted in a clockwise manner to the position illustrated in FIGURE 2 wherein the now lower edges of the inner sections of the side wings rest upon and abut the shoulders 30 of the weather flange 26. Straps or bars 115 may then be secured to the side wings and the weather flange by screws or bolts 116 which extend through suitable apertures in the bars 115 into threaded bores or sockets provided in the inner sections of the side wings and in the weather flange 26 below the shoulders 30, whereby the fully extended side wings are rigidly secured to the rear section and enclose the side spaces between the upper front and rear sections to form a shelter, the front section forming an angularly upwardly extending roof. The rear section may then be used as a sleeping or living shelter.

The rear section may be provided with lift planes 124 which may be moved between the retracted and expanded positions illustrated in FIGURES 1 and 3, respectively, and held in their extended positions by means of a suitable linkage 121 as is more fully explained in my copending application. The lift planes, when the boat is being used as a shelter, may be used as steps by means of which persons may climb into and out of the shelter. While the shelter as illustrated in FIGURE 2 has an open end, it will be apparent that any suitable means, such as a canvas panel, may be provided for closing the rear end of the shelter so formed.

It will now be seen that a new and improved sectional boat has been illustrated and described which is provided with a windshield and with side wings which extend rearwardly therefrom and wherein said windshield and wings are mounted on and pivotally secured to the front section of the boat for movement between the operative positions, shown in FIGURES 1 and 2, in which the windshield and the side wings function to protect the occupants of the front section of the boat from water, spray and wind, and a retracted position in which the windshield and the side wings are pivoted into the front section of the boat to be secured therein, so that the front section may be pivoted to a closed position overlying the rear section of the boat with the weather flange of the rear section telescoping into the front section.

It will further be seen that the side wings are formed of two complementary sections which are movable between a folded position wherein the inner or auxiliary section is disposed adjacent the inner sides of the main or inner sections and an extended position to provide the sides of a shelter formed by the two sections of the boat when the front section is moved to a position angularly overlying the rear section.

It will further be seen that the main and auxiliary sections may be secured in their extended position by any suitable means, such as the bars 104.

It will further be seen that the rear section is provided with a continuous weather flange which extends inwardly of the side and end walls of the rear section when the front section is moved to a fully closed position on the rear section and telescopes into such front section to prevent access of water into the rear section when the sections are folded to form the trailer.

It will further be seen that the weather flange is provided with a shoulder on which the lower edges of the auxiliary section of the side wings may rest when the boat is converted to a shelter and may be rigidly secured thereto by any suitable means such as the bars 115.

It will further be seen that, if desired, the shoulder 30 may be provided with an upwardly opening groove for receiving the lower edges of the auxiliary sections of the side wings, in which event the engagement of the lower edges of the auxiliary sections of the side wings in such recess would prevent lateral displacement thereof on the rear section thus obviating the need for the bars 115.

It will now be seen that a new and improved sectional boat has been illustrated and described which is provided with a windshield and side wings which may be folded into the boat when their use is not desired or when the boat is to be converted to a trailer, and which are of use as means or panels for enclosing the sides of a shelter formed by the front and rear sections of the boat when the front section is moved to a position angularly overlying the rear section.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A boat including: a front section and a rear section pivotally connected to said front section, said front section being provided at its forward end with a windshield and side wings extending rearwardly from the sides of the windshield, said side wings closing the sides of the shelter formed by the front and rear sections when the front section is pivoted to a position angularly overlying said rear section.

2. A boat including: a front section and a rear section pivotally connected to said front section, said front section being provided at its forward end with a windshield and side wings extending rearwardly from the sides of the windshield, said side wings closing the sides of the shelter formed by the front and rear sections when the front section is pivoted to a position angularly overlying said rear section, said side wings each being formed of a main section and an auxiliary section pivotally secured together along adjacent edges thereof, said auxiliary section being movable to a position in vertical alignment with said main section when said wing sections are in use to close the sides of the shelter.

3. A boat including: a front section and a rear section pivotally connected to said front sections, said front section being provided at its forward end with side wings extending rearwardly from the sides of the windshield, said windshield and side wings closing the sides of the shelter formed by the front and rear sections when the front section is pivoted to a position angularly overlying said rear section, said windshield and said side wings being pivotally secured to said front section for movement between operative positions wherein they extend upwardly of the front section and retracted positions wherein said windshield and said side wings are disposed within said front section whereby the front section can be moved to a fully closed position on said rear section.

4. A boat including: a front section and a rear section pivotally connected to said front section, said front section being provided at its forward end with a windshield and side wings extending rearwardly from the sides of the windshield, said side wings closing the sides of the shelter formed by the front and rear sections when the front section is pivoted to a position angularly overlying said rear section, said rear section having an upstanding flange telescopable into said front section when the front section is in fully closed position.

5. A boat including: a front section and a rear section pivotally connected to said front section, said front section being provided at its forward end with a windshield and side wings extending rearwardly from the sides of the windshield, said side wings closing the sides of the shelter formed by the front and rear sections when the front section is pivoted to a position angularly overlying said rear section, said windshield and said side wings being pivotally secured to said front section for movement between operative positions wherein they extend upwardly of the front section and retracted positions wherein said windshield and said side wings are disposed within said front section whereby the front section can be moved to a fully closed position on said rear section, said rear section having an upstanding flange telescopable into said front section when the front section is in fully closed position on said rear section.

6. A boat including: a front section and a rear section pivotally connected to said front section, said front section being provided at its forward end with a windshield and side wings extending rearwardly from the sides of the windshield, said side wings closing the sides of the shelter formed by the front and rear sections when the front section is pivoted to a position angularly overlying said rear section; and means for securing said windshield and said side wings in said operative positions.

7. A boat including: a front section and a rear section pivotally connected to said front section, said front section being provided at its forward end with a windshield and side wings extending rearwardly from the sides of the windshield, said side wings closing the sides of the shelter formed by the front and rear sections when the front section is pivoted to a position angularly overlying said rear section, said side wings each being formed of a main section and an auxiliary section pivotally secured together along adjacent edges thereof, said auxiliary section being movable to a position in vertical alignment with said main section when said wing sections are in use to close the sides of the shelter; and means for securing said windshield and said side wings in said operative positions.

8. A boat including: a front section and a rear section pivotally connected to said front section, said front section being provided at its forward end with a windshield and side wings extending rearwardly from the sides of the windshield, said side wings closing the sides of the shelter formed by the front and rear sections when the front section is pivoted to a position angularly overlying said rear section, said side wings each being formed of a main section and an auxiliary section pivotally secured together along adjacent edges thereof, said auxiliary section being movable to a position in vertical alignment with said main section when said wing sections are in use to close the sides of the shelter; means for securing said windshield and said side wings in said operative positions; and means securing said side wing sections in their vertically aligned positions.

9. A boat including: a front section and a rear section pivotally connected to said front section, said front section being provided at its forward end with a windshield and side wings extending rearwardly from the sides of the windshield, said side wings closing the sides of the shelter formed by the front and rear sections when the front section is pivoted to a position angularly overlying said rear section, said windshield and said side wings being pivotally secured to said front section for movement between operative positions wherein they extend upwardly of the front section and retracted positions wherein said windshield and said side wings are disposed within said front section whereby the front section can be moved to a fully closed position on said rear section, said front section having a top deck extending inwardly of the sides of said front section and front end of said front section, said side wings being positioned outwardly and below said inner edges of said top deck when in retracted positions.

10. A boat including: a front section and a rear section pivotally connected to said front section, said front section being provided at its forward end with a windshield and side wings extending rearwardly from the sides of the windshield, said side wings closing the sides of the shelter formed by the front and rear sections when the front section is pivoted to a position angularly overlying said rear section, said rear section being provided with a pair of ground engaging wheels, said ground engaging wheels being retractible into said rear section.

11. A boat including: a front section and a rear section pivotally connected to said front section, said front section being provided at its forward end with a windshield and side wings extending rearwardly from the sides of the windshield, said front section having an upwardly extending weather flange, said windshield and said side wings having lower edge portions disposed outwardly of and abutting said weather flange of said front section.

12. A boat including: a front section and a rear section pivotally connected to said front section, said front section being provided at its forward end with a windshield and side wings extending rearwardly from the sides of the windshield, said front section having an upwardly extending weather flange, said windshield and said side wings having lower edge portions disposed outwardly of and abutting said weather flange of said front section when said side wings and said windshield are in raised position, said windshield and said side wings being pivotally connected to said front section by hinge links, said hinge links being pivotally connected at opposite ends thereof to said front section and to said windshield and said side wings.

13. A boat including: a front section and a rear section pivotally connected to said front section, said front section being provided at its forward end with a windshield and side wings extending rearwardly from the sides of the windshield, said front section having an upwardly extending weather flange, said windshield and said side wings having lower edge portions disposed outwardly of and abutting said weather flange of said front section when said side wings and said windshield are in raised position, said windshield and said side wings being pivotally connected to said front section by hinge links, said hinge links being pivotally connected at opposite ends thereof to said front section and to said windshield and said side wings, said side wings having incurved forward portions engageable by lateral portions of said windshield when said side wings and said windshield are in raised position.

14. A boat including: a front section and a rear section pivotally connected to said front section, said front section being provided at its forward end with a windshield and side wings extending rearwardly from the sides of the windshield, said front section having an upwardly extending weather flange, said windshield and said side wings having lower edge portions disposed outwardly of and abutting said weather flange of said front section when said side wings and said windshield are in raised position, said windshield and said side wings being pivotally connected to said front section by hinge links, said hinge links being pivotally connected at opposite ends thereof to said front section and to said windshield and said side wings, said side wings having incurved forward portions engageable by lateral portions of said windshield when said side wings and said windshield are in raised position, said hinge link of said side wings being pivoted about axes disposed angularly to the longitudinal axis of said boat whereby said wing sections are moved inwardly and rearwardly into the front section upon movement from their raised positions.

References Cited in the file of this patent

UNITED STATES PATENTS

| | | |
|---|---|---|
| 1,042,925 | Kennedy | Oct. 29, 1912 |
| 1,481,548 | Gongaware | Jan. 22, 1924 |
| 1,560,983 | Gibbs | Nov. 10, 1925 |
| 1,788,436 | Lunt | Jan. 13, 1931 |
| 2,047,941 | Condon | July 21, 1936 |
| 2,102,123 | Leveau | Dec. 14, 1937 |
| 2,157,186 | Pinter | May 9, 1939 |
| 2,168,661 | Anderson | Aug. 8, 1939 |
| 2,496,055 | King | Jan. 31, 1950 |
| 2,582,635 | Kipple | Jan. 15, 1952 |
| 2,727,484 | White | Dec. 20, 1955 |
| 2,890,466 | Bly | June 16, 1959 |

FOREIGN PATENTS

| | | |
|---|---|---|
| 521,723 | Italy | Mar. 30, 1955 |
| 1,125,937 | France | July 23, 1956 |

UNITED STATES PATENT OFFICE
CERTIFICATE OF CORRECTION

Patent No. 3,071,786

January 8, 1963

Louis E. Levinson

It is hereby certified that error appears in the above numbered patent requiring correction and that the said Letters Patent should read as corrected below.

Column 6, line 26, after "with" insert -- a windshield and --; line 28, strike out "windshield and".

Signed and sealed this 9th day of July 1963.

(SEAL)
Attest:

ERNEST W. SWIDER
Attesting Officer

DAVID L. LADD
Commissioner of Patents